United States Patent
Kim et al.

(10) Patent No.: US 6,954,635 B2
(45) Date of Patent: Oct. 11, 2005

(54) MOBILE PRINTER SYSTEM

(75) Inventors: Jong Hwan Kim, Daejun (KR); Shin Kim, Daejun (KR); Myung Jin Jung, Seoul (KR); Heung Soo Kim, Choongchungnam-Do (KR); Dong Han Kim, Daejun (KR); Kui Hong Park, Jeju-Du (KR); Kang Hee Lee, Seoul (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 534 days.

(21) Appl. No.: 09/956,863

(22) Filed: Sep. 21, 2001

(65) Prior Publication Data

US 2002/0042267 A1 Apr. 11, 2002

(30) Foreign Application Priority Data

Sep. 22, 2000 (KR) ................ 10-2000-0055835

(51) Int. Cl.[7] ............................... H04M 3/00
(52) U.S. Cl. ............... 455/418; 455/419; 455/420; 400/70
(58) Field of Search .............. 455/88, 418, 419, 455/420, 556.1, 556.2, 41.1, 41.2, 456.5, 457; 705/21; 400/700, 61, 70; 379/102.01, 102.02; 348/14.01

(56) References Cited

U.S. PATENT DOCUMENTS 5,031,098 A * 7/1991 Miller et al. ................. 705/21
6,246,884 B1 * 6/2001 Karmi et al. ............... 455/521
6,379,059 B2 * 4/2002 Kaplan ....................... 400/76

FOREIGN PATENT DOCUMENTS

JP 409323589 A * 12/1997
JP 410122871 A * 5/1998 ........... G01C/21/00

* cited by examiner

Primary Examiner—Melur Ramakrishnaiah
(74) Attorney, Agent, or Firm—Greenblum & Bernstein, P.L.C.

(57) ABSTRACT

The present invention relates to a printing through a plurality of printer robot systems. Specifically, the invention provides a mobile printer system which prints letters or pictures inputted by a user without being constrained by the printing region through a plurality of mobile printer robots. The present invention comprises a plurality of mobile printer robot systems which have in-built printer functions and a main body which controls the printer operations through a wireless communication with the printer robot system.

6 Claims, 1 Drawing Sheet

MOBILE PRINTER SYSTEM

BACKGROUND OF THE INVENTION

The present invention relates to printer systems. More particularly, the invention relates to a mobile printer system which prints letters or pictures inputted by a user without being constrained by printing regions through a plurality of mobile printer robots. Generally, a printer is an auxiliary apparatus to a computer and is used in connection with a computer through a cable at a fixed location. Printing is carried out in a size appropriate to the corresponding papers.

SUMMARY OF THE INVENTION

However, the printing regions for the conventional printers were constrained by the loaded papers and the size of the printers. The present invention is designed to overcome the above problems of prior art. The object of the invention is to provide a mobile printer system which prints letters or pictures inputted by a user without being constrained by printing regions through a plurality of mobile printer robots.

Figure 1:
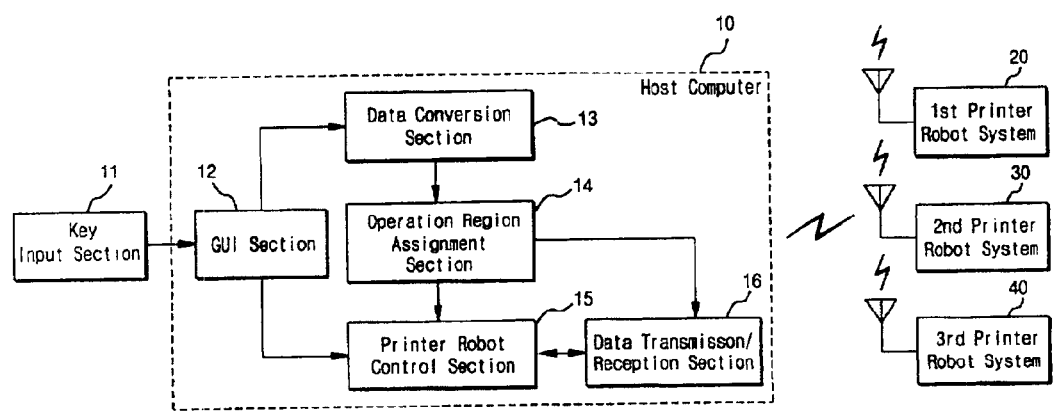
FIG. 1 is a block diagram which shows the mobile printer system according to a preferred embodiment of the present invention.

[Description of the Numeric on the Main Parts of the Drawings]
10: Host Computer
20, 30, 40: Printer Robot System
11: Key Input Section
12: GUI section
13: Data Conversion Section
14: Operation Region Assignment Section
15: Printer Robot Control Section
16: Data Transmission/Reception Section

DETAILED DESCRIPTION OF THE EMBODIMENTS

In order to achieve the stated objective, the mobile printer system according to the present invention comprises a plurality of mobile printer robot systems which have in-built printer functions and a main body which controls the printer operations through a wireless communication with the printer robot system.

Hereinafter, preferred embodiments of the present invention will be described in detail with reference to the accompanying drawings.

FIG. 1 is a block diagram which shows the mobile printer system according to a preferred embodiment of the present invention.

The apparatus in FIG. 1 comprises a plurality of printer robot systems 20, 30, 40 and a computer 10 which controls the printer operations. The host computer further comprises a key input section 11 which conveys the printer commands, a Graphic User Interface (GUI) section 12 which performs the interface between the users and host computer, a data conversion section 13 which converts the user input data received by the GUI section 12 to operation data which enables the printing process, an operation region assignment section 14 which is for outputting the operation region assignment data by assigning the operation regions of the plurality of printer robot systems 20, 30, 40, a printer robot control section 15 which is for controlling the printer robot systems by communicating with the plurality of printer robot systems 20, 30, 40, and a data transmission/reception section 16 which enables data transmission and reception among the plurality of printer robot systems 20, 30, 40.

Hereinafter, the operation of the mobile printer system as constructed in FIG. 1 will be explained in greater detail.

The printer robot systems 20, 30, 40 in FIG. 1 have in-built printer operation programs and are equipped with printer head, nozzle and ink spray device which are essential for a printer to function. Also, an in-built camera (not shown), which generates location data in order to transmit its location to the host computer, is installed. For a precision movement, a global vision camera (not shown) might be installed on the printer robot systems. A user selects a mobile printer mode through the key input section 11. Afterwards, the user inputs the pictures or letters to be printed using the GUI section 12. In the mean time, when the mobile printer mode selection signal is inputted from the key input section 11, the GUI section 12 outputs the signal through the printer robot control section 15 and the printer robot control section sets up an initial data for controlling of the printer robot. More specifically, the number of printer robots and location information are initialized. The GUI section 12 outputs the input data such as pictures or letters inputted by the user through the data conversion section 13. The data conversion section 13 converts the input data into operation data in order to enable the printer operation and outputs the operation data to the operation region assignment section 14. The operation region assignment section 14 assigns the operation regions using the methods such as an evolutionary calculation method (☐☐☐☐☐) in order to distribute the printing tasks among the plurality of the printer robot systems. Once operation regions are assigned the operation region assignment data and operation data are outputted to the data transmission/reception section 16. The data transmission/reception section 16 transmits the operation region assignment data and operation data to the corresponding printer robot system. The first, second and third printer robot systems 20, 30, 40 execute printing operation in the region corresponding to each of the systems by receiving the operation region assignment data and operation data inputted from the data transmission/reception section 16. In order to be precise with these printer operations, each of the printer robot systems 20, 30, 40 continuously sends its location data and operation data to the host computer 10 using the in-built camera. The printer robot control section 15 of the host computer 10 controls the print operation of each of the printer robot systems, 30, 40 by receiving the location data and operation data through the communication with the data transmission/reception section 16 and the plurality of printer robot systems 20, 30, 40.

Hence, the mobile printer system according to the present invention is capable of printing without being constrained by the printer sizes and regions since a plurality of mobile printer robots are being utilized.

What is claimed is:
1. A mobile printer system, comprising:
   a plurality of mobile printer robot systems configured to print; and
   a main body configured to control at least one print operation of the mobile printer robot systems through a wireless communication with the mobile printer robot systems,
   wherein each of the mobile robot systems is configured to send respective location data to the main body,
   wherein the main body is configured to control a print operation of each of the mobile robot systems based on the respective location data.

2. The system as claimed in claim 1, wherein each of the mobile printer robot systems include a respective camera configured to transmit the respective location data of said plurality of mobile printer robot systems to said main body.

3. The system as claimed in claim 1, wherein said plurality of mobile printer robot systems include a global vision camera.

4. The system as claimed in claim 1, wherein the main body includes:

- a key input section configured to convey a printer command from a user;
- a Graphic User Interface (GUI) section configured to interface the user and a host computer and to receive at least one picture or letter inputted by the user;
- a data conversion section configured to convert user input data received by the GUI section to operation data enabling a printing process;
- an operation region assignment section configured to output operation region assignment data by assigning operation regions of the plurality of printer robot systems;
- a data transmission/reception section configured to receive the location data from said plurality of mobile printer robot systems and to transmit said operation data and said operation region assignment data to said plurality of mobile printer robot systems; and
- a printer robot control section configured to control the print operation of each of the printer robot systems by receiving the location data of said plurality of mobile printer robot systems received from the data transmission/reception section.

5. The system as claimed in claim 4, wherein said operation region assignment section executes an evolutionary calculation.

6. The system as claimed in claim 4, wherein said data transmission/reception section is configured to receive and transmit wirelessly.

* * * * *